US010516589B2

(12) United States Patent
Innes et al.

(10) Patent No.: US 10,516,589 B2
(45) Date of Patent: Dec. 24, 2019

(54) SENSOR WEB MANAGEMENT SYSTEM FOR INTERNET OF THINGS SENSOR DEVICES WITH PHYSICALLY IMPRINTED UNIQUE FREQUENCY KEYS

(71) Applicant: AT&T Intellectual Property I, L.P., Atlanta, GA (US)

(72) Inventors: Timothy Innes, Atlanta, GA (US); Alexander MacDougall, Newnan, GA (US); Nigel Bradley, McDonough, GA (US); Bhumit Patel, Atlanta, GA (US); Christopher Carl, Atlanta, GA (US); David Spivey, Smyrna, GA (US); Wasib Khallil, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 187 days.

(21) Appl. No.: 15/252,793

(22) Filed: Aug. 31, 2016

(65) Prior Publication Data
US 2018/0060153 A1    Mar. 1, 2018

(51) Int. Cl.
*H04L 5/22* (2006.01)
*H04B 1/713* (2011.01)
(Continued)

(52) U.S. Cl.
CPC .......... *H04L 43/0817* (2013.01); *G06F 11/30* (2013.01); *H04B 1/7143* (2013.01);
(Continued)

(58) Field of Classification Search
CPC ....... H04W 4/02; H04W 4/046; H04W 48/00; H04W 48/08; H04W 48/12; B60R 25/10;
(Continued)

(56) References Cited

U.S. PATENT DOCUMENTS 5,179,569 A * 1/1993 Sawyer ................. A61B 5/411
375/133
7,830,838 B2   11/2010 Kohvakka et al.
(Continued)

FOREIGN PATENT DOCUMENTS

CN    101222397    7/2008
KR    20060069147    6/2006
(Continued)

OTHER PUBLICATIONS

"AT&T Enhances IoT Connectivity with New Satellite Services," Apr. 25, 2016, retrieved at http://about.att.com/story/att_enhances_iot_with_satellite_services.html, At&T.
(Continued)

*Primary Examiner* — Joseph O Schell
(74) *Attorney, Agent, or Firm* — Hartman & Citrin LLC

(57) ABSTRACT

Concepts and technologies are disclosed herein for a sensor web for Internet of Things ("IoT") devices. According to one aspect disclosed herein, a system can monitor a health status of an IoT sensor device of a plurality of IoT sensor devices. The system can determine that the health status of the IoT sensor device indicates a sensor malfunction experienced by the IoT sensor device, and in response, can generate and send an alert to a forensic analytics module. The alert can identify the sensor malfunction. In response to the alert, the forensic analytics module can determine a last known location of the IoT sensor device. The system can obtain a set of satellite images of the last known location of the IoT sensor device, and can utilize the set of satellite images of the last known location to determine a cause of the sensor malfunction.

20 Claims, 9 Drawing Sheets

(51) Int. Cl.
*H04L 12/26* (2006.01)
*H04B 1/7143* (2011.01)
*H04L 12/24* (2006.01)
*G06F 11/30* (2006.01)
*H04W 4/02* (2018.01)
*H04L 5/26* (2006.01)

(52) U.S. Cl.
CPC .............. *H04L 41/06* (2013.01); *H04B 1/713* (2013.01); *H04L 5/22* (2013.01); *H04L 5/26* (2013.01); *H04L 41/0631* (2013.01); *H04L 41/0654* (2013.01); *H04W 4/02* (2013.01)

(58) Field of Classification Search
CPC ...... B60R 25/1025; G07C 5/00; G07C 5/006; G07C 5/008; G07C 5/0816; H04L 5/0048; H04L 5/0051; H04L 5/0005; H04L 5/0007; H04L 5/20; H04L 5/22; H04L 5/26; H04B 1/713; H04B 1/7143; H04B 1/7136
See application file for complete search history.

(56) References Cited

U.S. PATENT DOCUMENTS

| | | | |
|---|---|---|---|
| 8,134,942 B2 | 3/2012 | Messinger et al. | |
| 8,495,377 B2 | 7/2013 | Haddad et al. | |
| 8,908,562 B2 | 12/2014 | Zhang et al. | |
| 8,984,113 B2 | 3/2015 | Li et al. | |
| 8,994,556 B2 * | 3/2015 | Lundy | G08C 17/02 340/539.11 |
| 9,030,941 B2 | 5/2015 | Michel et al. | |
| 9,237,505 B2 | 1/2016 | Munari et al. | |
| 9,288,059 B2 | 3/2016 | Nix | |
| 9,288,114 B2 | 3/2016 | Zhang et al. | |
| 9,335,816 B2 | 5/2016 | Feng et al. | |
| 9,357,381 B2 | 5/2016 | Cho et al. | |
| 2005/0221896 A1 * | 10/2005 | Lum | A63F 13/06 463/42 |
| 2007/0165754 A1 * | 7/2007 | Kiukkonen | H04B 1/715 375/346 |
| 2012/0022748 A1 * | 1/2012 | Swanson | G08C 17/02 701/48 |
| 2013/0050478 A1 * | 2/2013 | Tadepalli | G06K 9/0063 348/143 |
| 2013/0127618 A1 * | 5/2013 | Sheleheda | H04L 63/1416 340/540 |
| 2013/0182615 A1 | 7/2013 | Sun et al. | |
| 2014/0101255 A1 | 4/2014 | Pal et al. | |
| 2014/0297826 A1 | 10/2014 | Park | |
| 2014/0347193 A1 | 11/2014 | Ljung et al. | |
| 2014/0380264 A1 * | 12/2014 | Misra | G06F 8/00 717/100 |
| 2015/0264586 A1 | 9/2015 | Girardeau | |
| 2015/0281116 A1 | 10/2015 | Ko et al. | |
| 2015/0356861 A1 * | 12/2015 | Daoura | G08B 21/0269 340/539.13 |
| 2016/0049824 A1 | 2/2016 | Stein et al. | |
| 2016/0072892 A1 | 3/2016 | Shi et al. | |
| 2016/0135242 A1 | 5/2016 | Hampel et al. | |
| 2016/0149777 A1 | 5/2016 | Kim | |
| 2017/0099353 A1 * | 4/2017 | Arora | H04L 67/12 |
| 2017/0178013 A1 * | 6/2017 | Beloglazov | G06N 7/005 |

FOREIGN PATENT DOCUMENTS

| | | |
|---|---|---|
| WO | 2013/072925 | 5/2013 |
| WO | 2013/123445 | 8/2013 |

OTHER PUBLICATIONS

NG et al., "Capturing and Analyzing Pervasive Data for SmartHealth," 2014 IEEE 28th International Conference on Advanced Information Networking and Applications, May 13-16, 2014, pp. 985-992, IEEE 2014.

Dutta et al., "Design of a Wireless Sensor Network Platform for Detecting Rare, Random, and Ephemeral Events," Proceedings of the 4th International Symposium on Information Processing in Sensor Networks, Apr. 25-27, 2005, IEEE 2005.

Gu et al., "Radio-Triggered Wake-Up for Wireless Sensor Networks," Real-Time Systems, Mar. 2005, vol. 29, Issue 2, pp. 157-182.

Karlof et al., "Secure Routing in Wireless Sensor Networks: Attacks and Countermeasures," Ad Hoc Networks, Sep. 2003, vol. 1, Issues 2-3, pp. 293-315.

Kurose et al., "An End-User-Responsive Sensor Network Architecture for Hazardous Weather Detection, Prediction and Response," Conference Paper, Asian Internet Engineering Conference, Jan. 2006, Springer-Verlag Berlin Heidelberg.

* cited by examiner

SENSOR WEB MANAGEMENT SYSTEM FOR INTERNET OF THINGS SENSOR DEVICES WITH PHYSICALLY IMPRINTED UNIQUE FREQUENCY KEYS

BACKGROUND

The Internet of Things ("IoT") is a concept of making physical objects, collectively "things," network addressable to facilitate interconnectivity for the exchange of data. IoT represents a significant business opportunity for service providers. Industry standards for the IoT infrastructure are currently in flux. To realize the lucrative promise of this new industry, issues associated with network capacity, forensic accountability, and data security must be addressed.

Without exaggeration, the IoT industry has the potential to exponentially increase the amount internet traffic. Within a matter of years, the impact of this new internet traffic will dramatically affect network capacity and result in a need for tools for service providers to implement to efficiently allocate this vital resource.

Cyber security breaches are becoming ever prevalent. How service providers and other entities respond to these security breaches will define the quality and reputation of their IoT architecture. Currently, if an IoT device is breached, tampered with, stolen, broken, or otherwise compromised so as to malfunction, there is very little that can be done to resume communications with the IoT device. If an IoT device has experienced a malfunction and goes offline, that IoT device is impossible to track, and for this reason, it is also impossible to determine the cause of the malfunction. At this point, service providers have no tools at their disposal to determine what happened to the IoT device, who attacked it, why they attacked it, or if there even was an attack. A service provider's service/product line and branding will be defined by how they are capable of determining the causal factors of IoT device malfunctions and reacting to these malfunctions quickly to resume normal operations. For these reasons, forensic accounting tools are vital for a service provider's IoT architecture.

The cost, size, and power define the design and functional limits of traditional IoT sensors. These sensors are small, which means that they have small processors, and, for this reason, do not have the crypto stack typically utilized in a general purpose computer. Services such as data encryption therefore are not available for today's IoT sensors. As more and more IoT sensors are deployed, the security implications of insecure data exchange among IoT sensors becomes increasingly problematic. The future success of the IoT industry depends largely on the implementation of proper security features to eliminate insecure data exchanges among other security vulnerabilities.

SUMMARY

Concepts and technologies are disclosed herein for a sensor web for Internet of Things ("IoT") devices. According to one aspect disclosed herein, a sensor web management system can execute, via one or more processors, a monitoring module to monitor a health status of an IoT sensor device of a plurality of IoT sensor devices. The sensor web management system can determine that the health status of the IoT sensor device indicates a sensor malfunction experienced by the IoT sensor device, and in response, can generate and send an alert to a forensic analytics module. The alert can identify the sensor malfunction. In response to the alert, the sensor web management system can execute via the processor(s) the forensic analytics module to determine a last known location of the IoT sensor device. The sensor web management system can obtain a set of satellite images of the last known location of the IoT sensor device, and can utilize the set of satellite images of the last known location to determine a cause of the sensor malfunction.

In some embodiments, the sensor web management system can report the cause of the sensor malfunction. In addition, the sensor web management system can generate a recommendation that includes a course of action utilized to mitigate a further sensor malfunction due to the cause of the sensor malfunction. The sensor web management system can provide the recommendation to an entity that is capable of implementing the course of action to mitigate the further sensor malfunction due to the cause.

The sensor malfunction can be or can include a data stream malfunction. The sensor malfunction can be or can include a lost signal malfunction. The sensor malfunction can be or can include a location shift malfunction. The sensor malfunction can be or can include a location unavailable malfunction.

The sensor web management system, in some embodiments, can utilize the set of satellite images of the last known location of the IoT sensor to determine the cause of the sensor malfunction by comparing the set of satellite images to an archive of satellite images of the last known location of the IoT sensor device to determine whether the cause of the sensor malfunction is identifiable via a change within the set of satellite images from the archive of satellite images. The sensor web management system, in some embodiments, can record a time associated with the change. The sensor web management system, in some embodiments, can compile a list of surveillance systems located within an area served by the IoT sensor device. In some embodiments, the sensor web management system can notify law enforcement of the change.

The cause of the sensor malfunction can be a natural cause, such as a result of a tornado, hurricane, flooding, lightning damage, earthquake, or some other natural disaster. The cause of the sensor malfunction can be a local cyber-attack, wherein the entity responsible for the cyber-attack is physically located within the area served by the IoT sensor device. The cause of the sensor malfunction can be a remote cyber-attack, wherein the entity responsible for the cyber-attack is physical located outside of the area served by the IoT sensor device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
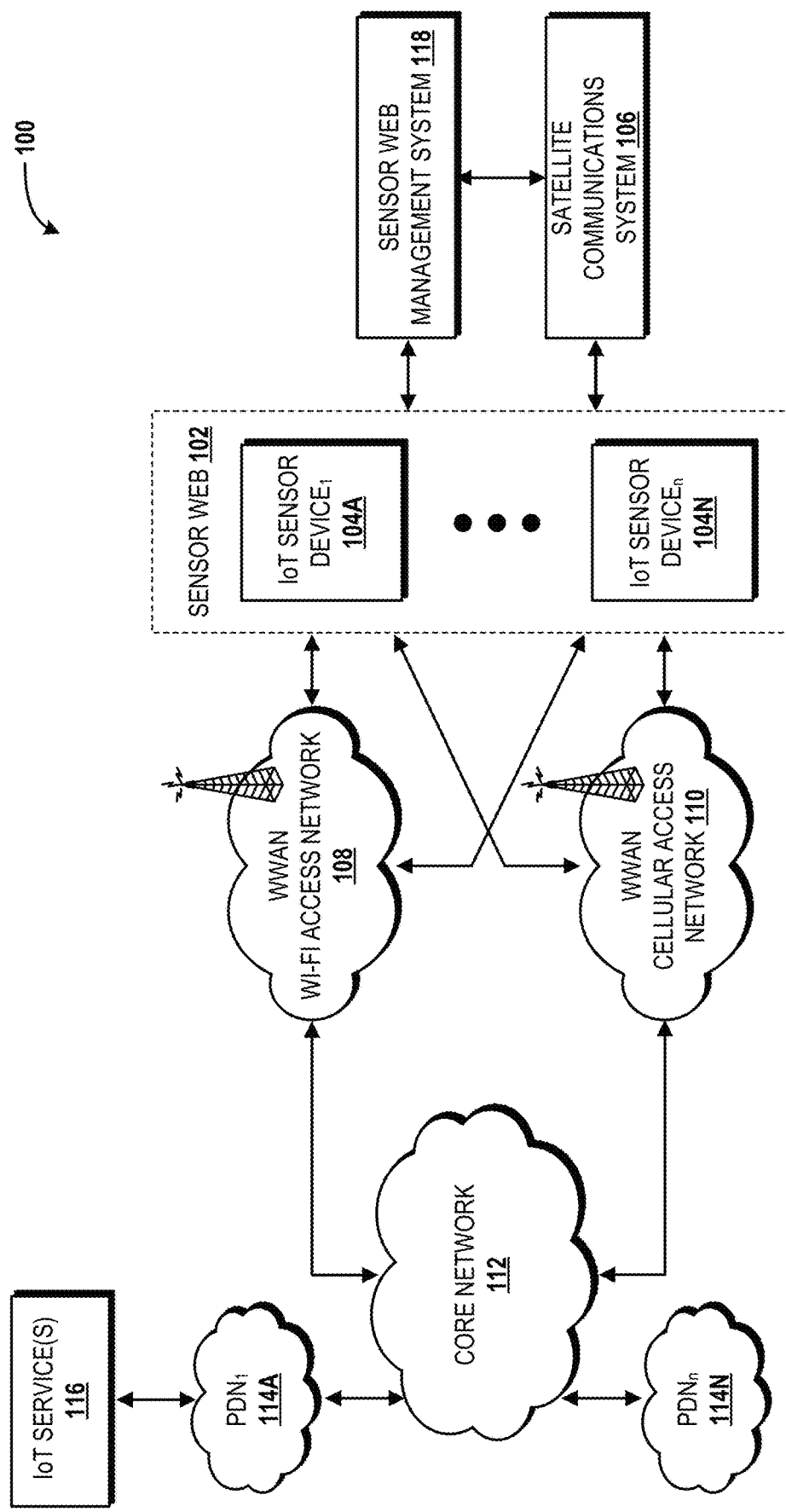
FIG. 1 is a block diagram illustrating aspects of an illustrative operating environment capable of implementing various aspects of embodiments disclosed herein.

The concepts and technologies disclosed herein are directed to a sensor web for IoT sensor devices. The sensor web disclosed herein provides expanded network capacity, increased forensic accountability, and upgraded data security. The sensor web disclosed herein can increase data throughput without requiring investment in more bandwidth. The sensor web accomplishes this through the use of a sparse data transmission scheme. In particular, the sensor web can throttle portions of sensor networks to provide more bandwidth for more critical sensor network areas.

The sensor web disclosed herein also can implement a redundant communication channel utilizing radio wave satellite communications that provide global positioning system ("GPS") tracking for each IoT device. The sensor web disclosed herein also can provide upgraded data security by embedding each sensor with a unique key. In some embodiments, each sensor is physically imprinted with a unique key. A server paired to an IoT sensor device can follow that device's unique key on a packet-by-packet basis. For example, a server can listen for a first data packet over a 5 gigahertz ("GHz") channel, a second packet over a 2.4 GHz channel, a third packet over the 2.4 GHz channel, and a fourth packet over the 5 GHz channel, and so on. Therefore, even if packets are being sniffed by a hacker, putting the packets back in order or establishing a context for the complete data transmission becomes exponentially more difficult the more IoT sensor devices that are connected to the sensor web. It is possible for an exemplary implementation of a sensor web to include tens of thousands to hundreds of thousands or greater numbers of individual IoT sensor devices.

The IoT sensor devices disclosed herein can include one or more sensors that are configured to reduce the data transmission rate, thus freeing up network capacity. The IoT sensor devices disclosed herein can be tracked via the disclosed sensor web even if rendered inoperable, such as by being forced offline. Moreover, the IoT sensor devices disclosed herein provide security through obfuscation. Even transmission over an unsecure network is made difficult to translate, to determine the ownership thereof, and/or to deduce the context thereof.

It should be appreciated that the above-described subject matter may be implemented as a computer-controlled apparatus, a computer process, a computing system, or as an article of manufacture such as a computer-readable storage medium. These and various other features will be apparent from a reading of the remaining Detailed Description and a review of the associated drawings.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a sensor web for IoT sensor devices will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes an IoT sensor web ("sensor web") 102. The sensor web 102 provides expanded network capacity, increased forensic accountability, and upgraded data security for a plurality of IoT sensor devices 104A-104N (referred to herein collectively as IoT sensor devices 104, or singularly as IoT sensor device 104). The sensor web 102 can increase data throughput without requiring service providers to invest in more bandwidth. The sensor web 102 accomplishes this through the use of a sparse data transmission scheme. In particular, the sensor web 102 can throttle one or more of the IoT sensor devices 104 to provide more bandwidth to one or more other devices of the IoT sensor devices 104 operating in the sensor web 102.

The sensor web 102 also can implement a redundant communication channel utilizing radio wave satellite communications that provide global positioning system ("GPS") tracking for each of the IoT sensor devices 104 via a satellite communications system 106. This redundant communication channel is especially effective for when an IoT sensor device 104 experiences a malfunction and goes offline.

The sensor web 102 can provide upgraded data security by embedding each of the IoT sensor devices 104 with a unique key. In some embodiments, each sensor is physically imprinted with a unique key. A server paired to an IoT sensor device can follow that device's unique key on a packet-by-packet basis. For example, a server can listen for a first data packet over a 5 gigahertz ("GHz") channel, a second data packet over a 2.4 GHz channel, a third data packet over the 2.4 GHz channel, and a fourth data packet over the 5 GHz channel, and so on. Therefore, even if data packets are being sniffed by a hacker, putting the data packets back in order or establishing a context for the complete data transmission becomes exponentially more difficult the more IoT sensor devices that are connected to the sensor web. It is possible for an exemplary implementation of the sensor web 102 to include tens of thousands to hundreds of thousands or greater numbers of individual IoT sensor devices 104. Additional details regarding this upgraded data security mechanism are described herein below with reference to FIG. 6.

Each of the IoT sensor devices 104 are configured to operate on and communicate with a wireless wide area network ("WWAN") WI-FI access network 108, a WWAN cellular access network 110, or both. The IoT sensor devices 104 can be or can include any "thing" that can collect data and that is configured to be network addressable so as to connect to and communicate with one or more networks, such as the WWAN WI-FI access network 108 and/or the WWAN cellular access network 110, over which to communicate the data to other connected devices, including, for example, computers, smartphones, tablets, vehicles, other computing devices, other IoT sensor devices, combinations thereof, and the like. The IoT sensor devices 104 can be deployed for consumer use, business use, and can find application in many industry-specific use cases. For example, the IoT sensor devices 104 may find at least partial application in the following industries: automotive, energy, healthcare, industrial, retail, and smart buildings/homes. Those skilled in the art will appreciate the applicability of IoT-solutions disclosed herein to other industries as well as consumer and business use cases. For this reason, the applications of the IoT sensor devices 104 described herein are used merely to illustrate some example applications, and therefore should not be construed as being limiting in any way.

Each of the access networks, including the WWAN WI-FI access network 108 and the WWAN cellular access network 110, can include one or more service areas (which may also be referred to herein as "cells") having the same or different cell sizes, which may be represented by different cell-types. As used herein, a "cell" refers to a geographical area that is served by one or more base stations operating within an access network. As used herein, a "base station" refers to a radio receiver and/or transmitter (collectively, transceiver) that is/are configured to provide a radio/air interface over which one or more IoT sensor devices, such as the IoT sensor devices 104, can connect to a network. Accordingly, a base station is intended to encompass one or more base transceiver stations ("BTSs"), one or more Node-Bs, one or more eNode-Bs, one or more home eNode-Bs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the IoT sensor devices 104.

A cell-type can be associated with certain dimensional characteristics that define the effective radio range of a cell. A cell-type can additionally represent the radio access technology ("RAT") utilized by a cell. Cell-types can include, but are not limited to, a macro cell-type, a metro cell-type, a femto cell-type, a pico cell-type, a micro cell-type, WLAN cell-type, a MSMC cell-type, and a white space network cell-type. For ease of explanation, a "small cell" cell-type is utilized herein to collectively refer to a group of cell-types that includes femto cell-type (e.g., home eNodeB), pico cell-type, and micro cell-type, in general contrast to a macro cell-type, which offers a larger coverage area. Other cell-types, including proprietary cell-types, temporary cell-types, and ad-hoc cell-types are also contemplated. An ad-hoc cell-type, for example, can include an IoT sensor device 104, functioning as a "hotspot" for facilitating connectivity for other devices, such as another of the IoT sensor devices 104, to connect to another potentially larger cell.

The WWAN cellular access network 110 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, combinations thereof, and/or the like. The WWAN cellular access network 108 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the IoT sensor devices 104. Data communications can be provided in part by the WWAN cellular access network 110 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the WWAN cellular access network 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The WWAN WI-FI access network 106 can operated in accordance with IEEE 802.11ah, IEEE 802.11af, or IEEE 802.11ah and IEEE 802.11af, and like standards that support WAN WI-FI.

The WWAN WI-FI access network 108 and/or the WWAN cellular access network 110 can be part of one or more mobile telecommunications networks that, in addition to providing network access to the IoT sensor devices 104, provide data access to one or more mobile devices, such as cellular smartphones and other cellular-enabled devices (e.g., tablets or laptops). As used herein, a mobile telecommunications network includes one or more radio access network ("RANs") (such as the WWAN WI-FI access network 108 and/or the WWAN cellular access network 110) and a WWAN, which may include one or more core networks 112, such as, for example, an evolved packet core ("EPC") network. The core network(s) 112 can include one or more IoT gateways (not shown) that interconnect access points in the WWAN WI-FI access network 108 and the WWAN cellular access network 110 to the core network 112.

The core network 112 embodied as an EPC network can include a mobility management entity ("MME"), a serving gateway ("SGW"), a packet data network ("PDN") gateway ("PGW"), and a home subscriber server ("HSS"). The PDN gateway interconnects the core network 112 and one or more external IP networks, shown in the illustrated embodiments as packet data networks ("PDNs") 114A-114N. The PGW routes IP packets to and from the PDNs 114A-114N. The PDN gateway also performs operations such as IP address/IP prefix allocation, policy control, and charging. In some implementations, the PGW and the SGW are combined. Moreover, IoT gateway functionality may be combined with the PGW and/or the SGW. The HSS is a database that contains user/subscriber information. The HSS also performs operations to support mobility management, call and session setup, user authentication, and access authorization. These concepts can be extended, as applicable, to the IoT sensor devices 104A-104N, or alternatively, a dedicated server for IoT sensor devices can be implemented within the core network 112 to handle authentication, authorization, accounting, and/or other aspects.

The PDNs 114A-114N can provide access to one or more IoT services 116. The IoT services 116 can include any consumer and/or business-oriented services. The IoT services 116 can be industry-specific. For example, the IoT services 116 can provide services in the automotive, energy, healthcare, industrial, retail, smart buildings/homes industries, and/or the like. Those skilled in the art will appreciate the applicability of the IoT services 116 to other industries. For this reason, the IoT services 116 described herein are used merely to illustrate some examples, and therefore should not be construed as being limiting in any way.

The illustrated operating environment 100 also includes a sensor web management system 118 operating in communication with the IoT sensor devices 104 of the sensor web 102. The sensor web management system 118 monitors a health status of each of the IoT sensor devices 104 deployed within the sensor web 102. In some embodiments, the health status of an IoT sensor device 104 can be normal or abnormal. A normal health status can indicate that the IoT sensor device 104 is operating within one or more operating parameters defined for normal operation. Likewise, an abnormal health status can indicate that the IoT sensor device 104 is operating outside of one or more operating parameters defined for normal operations, and can indicate that the IoT sensor device 104 has experienced a malfunction of some kind. It should be understood that the granularity of the health status monitored by the sensor web management system 118 can be changed to accommodate various implementations and the needs of a particular IoT sensor device 104. As such, the aforementioned examples should not be construed as being limiting in any way.

In the event of a sensor malfunction, the sensor web management system 118 can reconstruct the condition(s) that resulted in the sensor malfunction. For this reason, the sensor web management system 118 is in communication with the satellite communications system 106, which can employ GPS technology to provide aerial positioning, surveillance, and imaging of the area(s) in which the sensor malfunction occurred. A sensor malfunction can be triggered by any one or a combination of the following malfunction events: a weak or intermittent data stream (e.g., poor data connection); a lost signal (e.g., the IoT sensor device 104 has been disconnected from a network—i.e., the WWAN WI-FI access network 108 and/or the WWAN cellular access network 110); a location shift, whereby the physical location of the IoT sensor device 104 has moved beyond a predefined threshold boundary; and/or a location missing, whereby the physical location of the IoT sensor device 104 cannot be identified—i.e., the IoT sensor device 104 cannot communicate with the satellite communications system 106. Moreover, the sensor web management system 118 can attempt to classify the aforementioned events into one of three categories, including: a malfunction by a natural cause, such as a result of a tornado, hurricane, flooding, lightning damage, earthquake, or some other natural disaster; a malfunction by physical tampering or a close-proximity cyber-attack (local attack), wherein the entity responsible for the cyber-attack is physically located within the area served by the IoT sensor device; and a malfunction by a remote cyber-attack, wherein the entity responsible for the cyber-attack is physically located outside of the area served by the IoT sensor device.

Moreover, in response to one or more of the aforementioned events, the sensor web management system 118 can initialize a surveillance protocol that generates, among other things, a set of satellite aerial images at and around (e.g., within a predefined distance of) the last known location (collectively, "the observed area") of the IoT sensor device 104 via coordinating with the satellite communications system 106. The sensor web management system 118 utilizes the set of satellite aerial images to determine whether any suspicious activity exists in the area and/or if there are any vehicles and/or individuals seen leaving the area. The set of satellite aerial images also can be compared to an archive of satellite images that are taken at an interval such as daily, weekly, monthly, bi-monthly, random, or some other interval. If law enforcement is notified, the set of satellite aerial images can be utilized to generate, at least in part, a suspect list and/or a witness list.

The sensor web management system 118 also can record a time at which the event occurred, and can compile a list of existing public and/or private surveillance systems in the observed area that might have evidence (e.g., video and/or still images) of the sensor malfunction. Public surveillance systems can include, for example, traffic light cameras and the like. Private surveillance systems can include, for example, exterior cameras outside local businesses. The surveillance system list can be forwarded to law enforcement and/or private investigators, depending on the causal nature of the sensor malfunction.

Depending on the evidence collected, the sensor web management system 118 can generate one or more recommendations, including, for example, a course of action to prevent or at least mitigate the same type of sensor malfunction in the future to the same and/or similar IoT sensor devices 104. Once the sensor malfunction has been resolved and classified, the results can be fed back into the sensor web management system 118 as part of a learning algorithm to improve the sensor web management system 118 over time so as to more reliability predict future sensor malfunction and/or behaviors that may indicate that a sensor malfunction is imminent.

It should be understood that some implementations of the operating environment 100 include multiple sensor webs 102, multiple WWAN WI-FI access networks 108, multiple WWAN cellular access networks 110, multiple core networks 112, multiple sensor web management systems 118, multiple satellite communications systems 106, or some combination thereof. Thus, the illustrated embodiment should be understood as being illustrative, and should not be construed as being limiting in any way.

Figure 2:
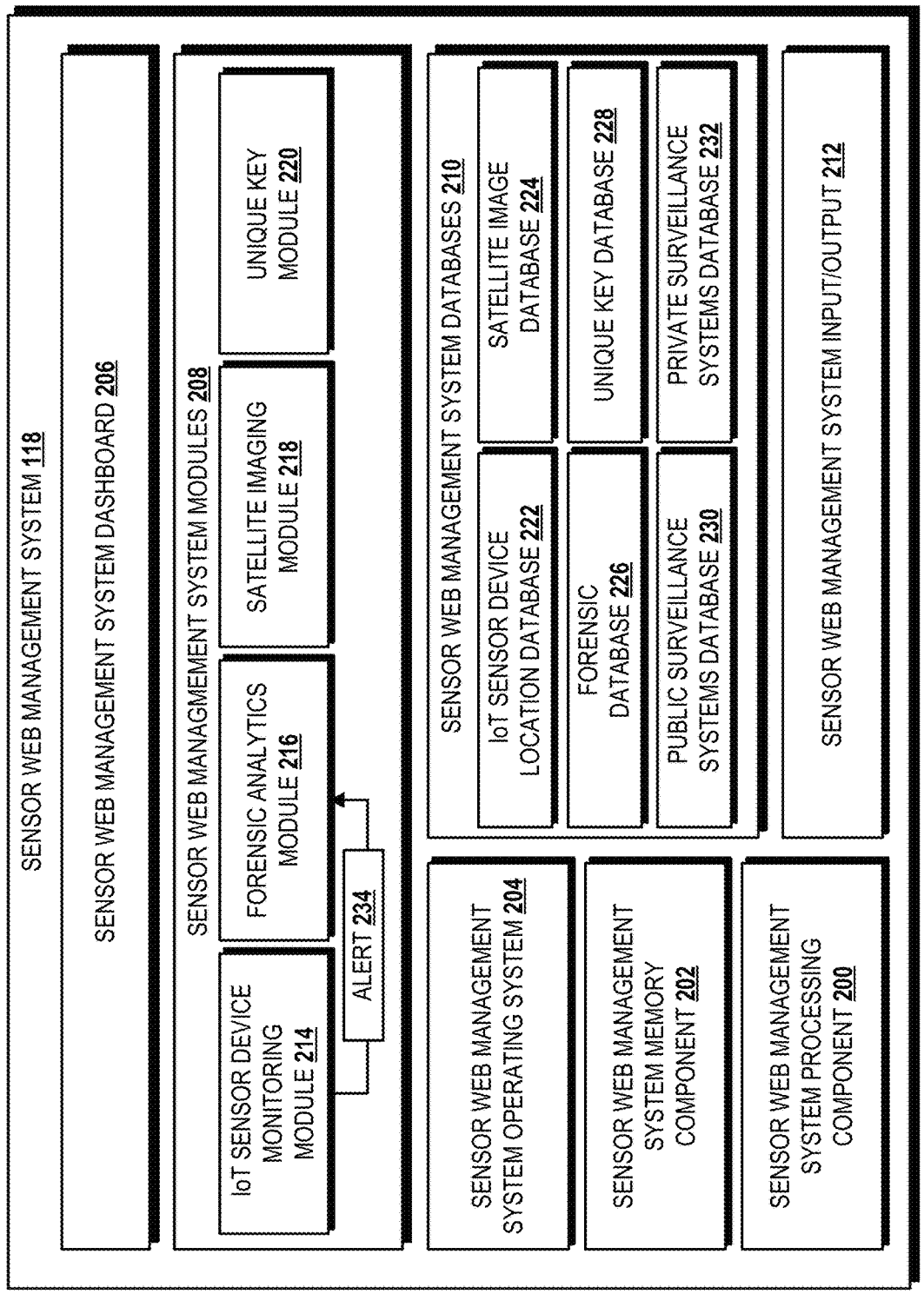
FIG. 2 is a block diagram illustrating aspects of a sensor web management system and components thereof capable of implementing aspects of the embodiments presented herein.

Turning now to FIG. 2, a block diagram illustrating aspects of the sensor web management system 118 and components thereof capable of implementing aspects of the embodiments presented herein will be described. The illustrated sensor web management system 118 includes a sensor web management system processing component 200, a sensor web management system memory component 202, a sensor web management system operating system 204, a sensor web management system dashboard 206, sensor web management system modules 208, sensor web management system databases 210, and sensor web management system input/output 212. FIG. 2 will be described with additional reference to FIG. 1.

The sensor web management system processing component 200 can include one or more hardware components that perform computations to process data, and/or to execute computer-executable instructions of one or more software modules, such as the sensor web management system modules 208, the sensor web management system operating system 204, and/or other software (not shown). The sensor web management system processing component 200 can include one or more central processing units ("CPUs") configured with one or more processing cores. The sensor web management system processing component 200 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the sensor web management system processing component 200 can include one or more discrete GPUs. In some other embodiments, the sensor web management system processing component 200 can include CPU and GPU components that are configured in accordance with a co-processing CPU/GPU computing model, wherein the sequential part of an application executes on the CPU and the computationally-intensive part is accelerated by the GPU. The sensor web management system processing component 200 can include one or more system-on-chip ("SoC") components along with one or more other components illustrated as being part of the sensor web management system 118, including, for example, the sensor web management system memory component 202. In some embodiments, the sensor web management system processing component 200 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The sensor web management system processing component 200 can be or can include one or more hardware components architected in accordance with an ARM architecture, available for license from ARM HOLDINGS of Cambridge, United Kingdom. Alternatively, the sensor web management system processing component 200 can be or can include one or more hardware components architected in accordance with an x86 architecture, such an architecture available from INTEL CORPORATION of Mountain View, Calif., and others. Those skilled in the art will appreciate the implementation of the sensor web management system processing component 200 can utilize various computation architectures, and as such, the sensor web management system processing component 200 should not be construed as being limited to any particular computation architecture or combination of computation architectures, including those explicitly disclosed herein.

The sensor web management system memory component 202 can include one or more hardware components that perform storage operations, including temporary or permanent storage operations. In some embodiments, the sensor web management system memory component 202 include volatile and/or non-volatile memory implemented in any method or technology for storage of information such as computer-readable instructions, data structures, program modules, the sensor web management system operating system 204, the sensor web management system modules 208, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the sensor web management system processing component 200.

The sensor web management system dashboard 206 is a user interface that allows users to interact with the functionality provided by the sensor web management system 118, and more particularly, the functionality provided by the sensor web management system modules 208 via execution by the sensor web management system processing component 200. The sensor web management system dashboard 206 can provide a user interface through which users can view a health status for each of the IoT sensor devices 104, such as, for example, whether each of the IoT sensor devices 104 is operating normally or abnormally (i.e., has experienced a sensor malfunction). The sensor web management system dashboard 206 also can provide a user interface through which users can view satellite images provided by the satellite communications system 106. The sensor web management system dashboard 206 also can provide a user interface through which users can view results of forensic traces to provide users with data to better understand the cause of a given sensor malfunction. The sensor web management system dashboard 206 also can allow users to view sensor data and other metrics captured by and/or generated by the sensor web management system 118 and/or the IoT sensor devices 104 operating in the sensor web 102.

The sensor web management system modules 208 can include an IoT sensor device monitoring module 214, a forensic analytics module 216, a satellite imaging module 218, and a unique key module 220. Each of the sensor web management system modules 208 can include instructions that, when executed by the sensor web management system processing component 200, cause the sensor web management system 118 to perform operations. The sensor web management system databases 210 can include an IoT sensor device location database 222, a satellite image database 224, a forensic database 226, a unique key database 228, a public surveillance systems database 230, and a private surveillance systems database 232. The sensor web management system modules 208 can interact with the sensor web management system databases 210 to store and retrieve various data associated with aspects of the operations of the sensor web management system 118.

The IoT sensor device location database 222 can store one or more locations (e.g., current location, last known location, past location, and/or the like) for each of the IoT sensor devices 104. The locations can be associated with a threshold boundary such that a given IoT sensor device 104 is considered to be in a location as long as that IoT sensor device 104 is within the threshold boundary. This can aid in reducing or eliminating false location-based malfunctions. The IoT sensor device location database 222 can be updated by the IoT sensor device monitoring module 214 periodically and/or in response to a request to do so (e.g., from a user or from the forensic analytics module 216 to determine a last known location).

The satellite image database 224 can store satellite images associated with each of the IoT sensor devices 104. The satellite images associated with each of the IoT sensor devices 104 can be associated with one or more location tags corresponding to the locations stored in the IoT sensor device location database 222. The satellite image database 224 can archive satellite images for comparison, by the forensic analytics module 216, to the set of satellite aerial images taken of the observed area of the IoT sensor device 104 in response to a sensor malfunction. The archive images can be taken at an interval, such as daily, weekly, monthly, bi-monthly, random, or some other interval.

The forensic database 226 can store any data associated with forensic analysis performed by the forensic analytics module 216. Forensic analysis can include a process of determining what happened to the IoT sensor device 104 after the fact, including, for example, deducing causal factors from the data collected. A goal is to determine a category for the sensor malfunction—either natural causes, malicious physical tampering, or cyber-attack.

The forensic database 226 can provide a foundation for a learning algorithm through which forensic data from forensic analysis is utilized to predict the cause of a sensor malfunction based upon correlation with past forensic data. Over time, the forensic database 226 can be fine-tuned to include associations with particular sensor malfunctions to aid the forensic analytics module 216 in identifying the cause(s) of a particular sensor malfunction that occurred. Moreover, the forensic database 226 can store, in association with particular sensor malfunctions and corresponding forensic data, one or more recommendations to mitigate and/or to prevent future sensor malfunctions. For example, the forensic analytics module 216 can utilize forensic data to determine if there was flooding in the area where the IoT sensor device 104 malfunctioned; if there was suspicious activity in the area where the IoT sensor device 104 malfunctioned; if a vehicle is visible leaving the area, and if so, whether still or video images can be utilized to acquire a license plate number of the vehicle. On the other hand, if there are no direct physical interactions with the IoT sensor device 104, then it can be determined the malfunction is due to a cyber-attack or a simple malfunction. Cyber-attacks can be addressed in several ways. For example, security could be increased and/or a honey pot trap could be set to trace the root IP address back to the original hacker.

The unique key database 228 can store a unique frequency key associated with each of the IoT sensor devices 104. A unique key can include a randomized frequency map assigned for each of the IoT sensor devices 104. The unique key can be physically imprinted on the IoT sensor devices 104. In some embodiments, these keys are imprinted at the factory, and for this reason, the maps do not need to be communicated via a network (e.g., the Internet). Additional details regarding unique key pair will be described herein below with reference to FIG. 7.

The public surveillance systems database 230 can store data associated with one or more public surveillance systems. This data can include time stamps, images, videos, and/or any other data captured by one or more public surveillance systems. Similarly, the private surveillance systems database 230 can store data associated with one or more private surveillance systems. This data can include time stamps, images, videos, and/or any other data captured by one or more private surveillance systems.

The IoT sensor device monitoring module 214 can be executed by the sensor web management system processing component 200 to monitor a health status of each of the IoT sensor devices 104 deployed within the sensor web 102. In the event of a sensor malfunction, the IoT sensor device monitoring module 214 can generate an alert 234 and can send the alert 234 to the forensic analytics module 216, which can perform forensic analysis to determine the cause of the sensor malfunction. As explained above, a sensor malfunction can be triggered by any one or a combination of the following events: a weak or intermittent data stream (e.g., poor data connection); a lost signal (e.g., the IoT sensor device 104 has been disconnected from a network—i.e., the WWAN WI-FI access network 108 and/or the WWAN cellular access network 110); a location shift, whereby the physical location of the IoT sensor device 104 has moved beyond a pre-defined threshold boundary; and/or a location missing, whereby the physical location of the IoT sensor device 104 cannot be identified—i.e., the IoT sensor device 104 cannot communicate with the satellite communications system 106.

In response to the alert 234, the forensic analytics module 216 can perform forensic analysis to determine the cause of the sensor malfunction. The forensic analytics module 216 can be executed by the sensor web management system processing component 200 to initialize a surveillance protocol. In particular, the forensic analytics module 216 can communicate with the satellite imaging module 218 to acquire a set of satellite aerial images at and around (e.g., within a predefined distance of) the last known location (collectively, "the observed area") of the IoT sensor device 104. The satellite imaging module 218 can be executed by the sensor web management system processing component 200 to communicate with the satellite communications system 106 via the sensor web management system input/output 212 to retrieve the set of satellite aerial images. The forensic analytics module 216 can utilize the set of satellite aerial images to determine whether any suspicious activity exists in the area and/or if there are any vehicles and/or individuals seen leaving the area. The set of satellite aerial images also can be compared to an archive of satellite images stored in the satellite image database 224.

The forensic analytics module 216 also can record a time at which the event occurred and can store the time in the forensic database 226. The forensic analytics module 216 can compile a list of existing public and/or private surveillance systems in the observed area by consulting with the public surveillance systems database 230 and the private surveillance systems database 232. The surveillance system list can be forwarded to law enforcement and/or private investigators, depending on the causal nature of the sensor malfunction.

Depending on the evidence collected, the forensic analytics module 216 can generate a set of recommendations. The set of recommendations can include a course of action to prevent or at least mitigate the same type of sensor malfunction in the future. Once the sensor malfunction has been resolved and classified, the results can be fed back into the forensic analytics module 216 as part of a learning algorithm to improve the forensic analytics module 216 to be better able to predict future sensor malfunction and/or behaviors that may indicate that a sensor malfunction is imminent.

It should be understood that some implementations of the sensor web management system 118 can include multiple sensor web management system processing components 200, multiple sensor web management system memory components 202, multiple sensor web management system operating systems 204, multiple sensor web management system dashboards 206, multiple IoT sensor device monitoring modules 214, multiple forensic analysis modules 216, multiple satellite imaging module 218, multiple unique key modules 220, multiple IoT sensor device location databases 222, multiple satellite image databases 224, multiple forensic databases 226, multiple unique key databases 228, multiple public surveillance systems databases 230, multiple private surveillance systems databases 232, multiple sensor web management system input/output 212, multiple alerts 234, or some combination thereof. Thus, the illustrated embodiment should be understood as being illustrative, and should not be construed as being limiting in any way. Moreover, the sensor web management system 118 can be implemented as a single system as shown or as multiple systems.

Figure 3:
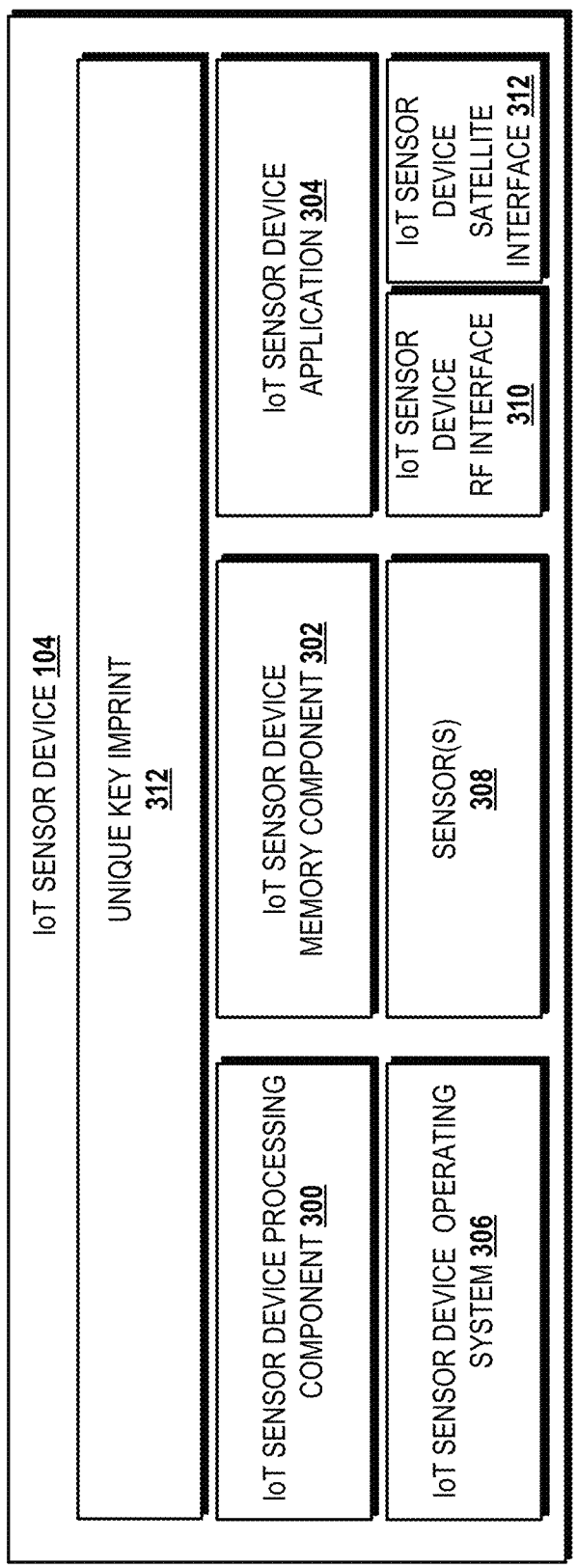
FIG. 3 is a block diagram illustrating aspects of an Internet of Things ("IoT") sensor device and components thereof capable of implementing aspects of the embodiments presented herein.

Turning now to FIG. 3, a block diagram illustrating aspects of an example IoT sensor device 104 and components thereof capable of implementing aspects of the embodiments presented herein will be described. The illustrated IoT sensor device 104 includes an IoT sensor device processing component 300, an IoT sensor device memory component 302, an IoT sensor device application 304, an IoT sensor device operating system 306, one or more IoT sensor device sensors 308, an IoT sensor device RF interface 310, and an IoT sensor device satellite interface 312. FIG. 3 will be described with additional reference to FIG. 1.

The IoT sensor device processing component 300 (also referred to herein as a "processor") can include one or more hardware components that perform computations to process data, and/or to execute computer-executable instructions of one or more application programs such as the IoT sensor device application 304, one or more operating systems such as the IoT sensor device operating system 306, and/or other software. The IoT sensor device processing component 300 can include one or more CPUs configured with one or more processing cores. The IoT sensor device processing component 300 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IoT sensor device processing component 300 can include one or more discrete GPUs. In some other embodiments, the IoT sensor device processing component 300 can include CPU and GPU components that are configured in accordance with a co-processing CPU/GPU computing model, wherein the sequential part of an application executes on the CPU and the computationally-intensive part is accelerated by the GPU. The IoT sensor device processing component 300 can include one or more SoC components along with one or more other components illustrated as being part of the IoT sensor device 104, including, for example, the IoT sensor device memory component 302. In some embodiments, the IoT sensor device processing component 300 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The IoT sensor device processing component 300 can be or can include one or more hardware components architected in accordance with an ARM architecture, available for license from ARM HOLDINGS of Cambridge, United Kingdom. Alternatively, the IoT sensor device processing component 300 can be or can include one or more hardware components architected in accordance with an x86 architecture, such an architecture available from INTEL CORPORATION of Mountain View, Calif., and others.

Those skilled in the art will appreciate the implementation of the IoT sensor device component 300 can utilize various computation architectures, and as such, the IoT sensor device processing component 300 should not be construed as being limited to any particular computation architecture or combination of computation architectures, including those explicitly disclosed herein.

The IoT sensor device memory component 302 can include one or more hardware components that perform storage operations, including temporary or permanent storage operations. In some embodiments, the IoT sensor device memory component 302 can include volatile and/or non-volatile memory implemented in any method or technology for storage of information such as computer-readable instructions, data structures, program modules, the IoT sensor device operating system 306, the IoT sensor device application 304, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IoT sensor device processing component 300.

The IoT sensor device application 304 can be executed by the IoT sensor device processing component 300 to perform operations such as gathering data associated with an observed area, sharing the data with the sensor web management system 118, processing instructions received from the sensor web management system 118, and other operations described herein. The IoT sensor device application 304 can execute on top of the IoT sensor device operating system 306. In some embodiments, the IoT sensor device application 304 is provided as firmware.

The IoT sensor device operating system 306 can control the operation of the IoT sensor device 104. In some embodiments, the IoT sensor device operating system 306 includes the functionality of the IoT sensor device application 304. The IoT sensor device operating system 306 can be executed by the IoT sensor device processing component 300 to cause the IoT sensor device 104 to perform various operations. The IoT sensor device operating system 306 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPO- RATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The sensor(s) 308 can include any sensor type or combination of sensor types utilizing any known sensor technology that is capable of detecting one or more characteristics of an environment, such as an observed area, in which the IoT sensor device 104 is deployed. More particularly, the sensor(s) 308 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof. Those skilled in the art will appreciate the applicability of the sensors 308 to various aspects of the IoT services 116, and for this reason, additional details in this regard are not provided.

The IoT sensor device RF interface 310 can include an RF transceiver or separate receiver and transmitter components. The IoT sensor device RF interface 310 can include one or more antennas and one or more RF receivers for receiving RF signals from and one or more RF transmitters for sending RF signals to the sensor web management system 118. The IoT sensor device satellite interface 312 provides an interface to the satellite communications system 106.

It should be understood that some implementations of the IoT sensor device 104 can include multiple IoT sensor device processing components 300, multiple IoT sensor device memory components 302, multiple IoT sensor device applications 304, multiple IoT sensor device operating systems 306, multiple IoT sensor device RF interfaces 310, multiple IoT sensor device satellite interfaces 312, or some combination thereof. Thus, the illustrated embodiment should be understood as being illustrative, and should not be construed as being limiting in any way.

Figure 4:
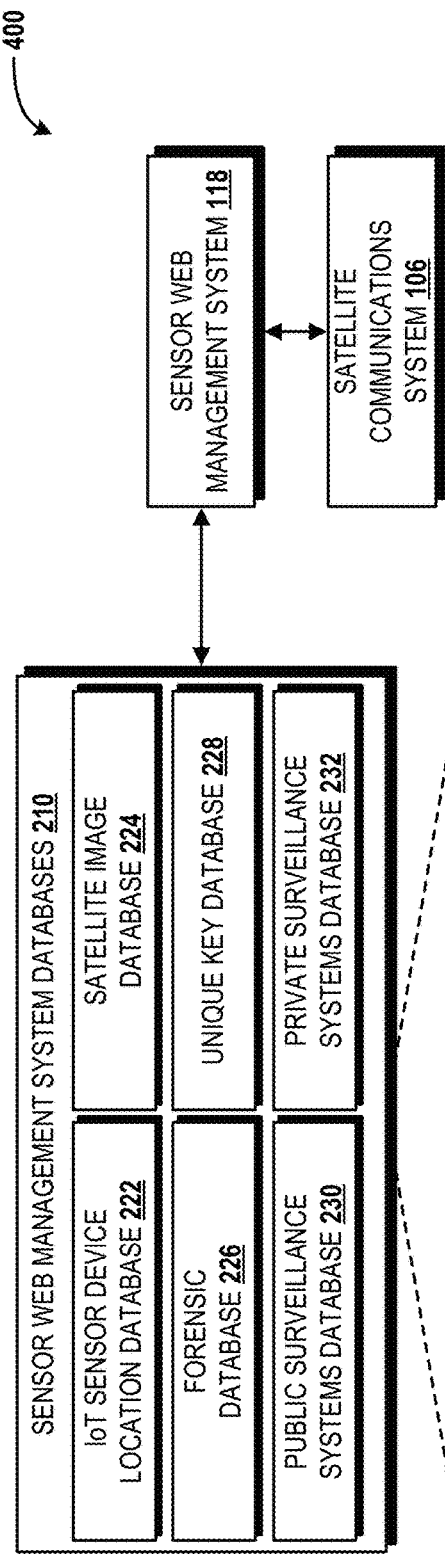
FIG. 4 is a block diagram illustrating aspects of an example map image displaying the locations of IoT sensor devices, according to an illustrative embodiment.
Figure 4:
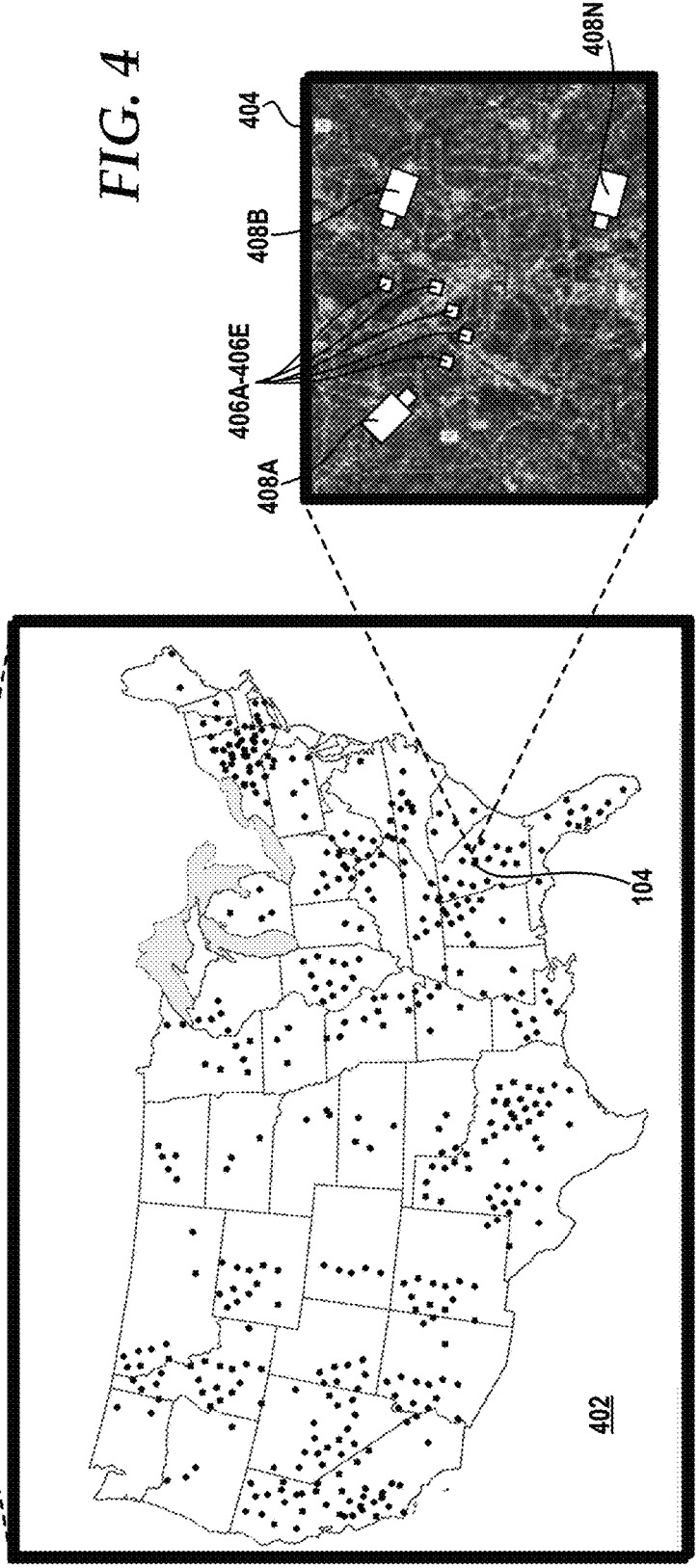

Turning now to FIG. 4, a block diagram 400 illustrating aspects of an example map image 402 displaying the locations of IoT sensor devices 104 will be described, according to an illustrative embodiment. The block diagram 400 includes the sensor web management system 118, the satellite communications system 106, and the sensor web management system databases 210 introduced above in FIGS. 1 and 2.

The example map image 402 includes a satellite image obtained by the sensor web management system 118 from the satellite communications system 106 of the continental United States with a plurality of the IoT sensor devices 104 deployed throughout. An exploded view 404 of the map image 402 shows satellite imagery with IoT sensor device representations 406A-406E of the IoT sensor devices 104A-104E and surveillance system representations 408A-408N of surveillance systems (public and/or private).

Overall, the sensor web management system 118 can record changes to the landscape surrounding each of the IoT sensor devices 104 in the sensor web 102. The forensic analytics module 216 over time will learn what changes are associated with certain types of sensor malfunctions. For example, weather systems that cause outages versus human behaviors that can be associated with the nefarious surveillance of a patch of sensors that leads to a tampering incident or a theft. With regard to cyber-attacks, the ability to rule out the above-mentioned physical incursions would allow system designers to move more quickly to address a cyber-attack. In other words, if it is known that the issue is not physical, then the evidence is more likely to suggest that the sensor malfunction was due to a cyber, not physical, attack. This translates to a process that can more rapidly deploy security patches, or take other defensive actions.

Figure 5:
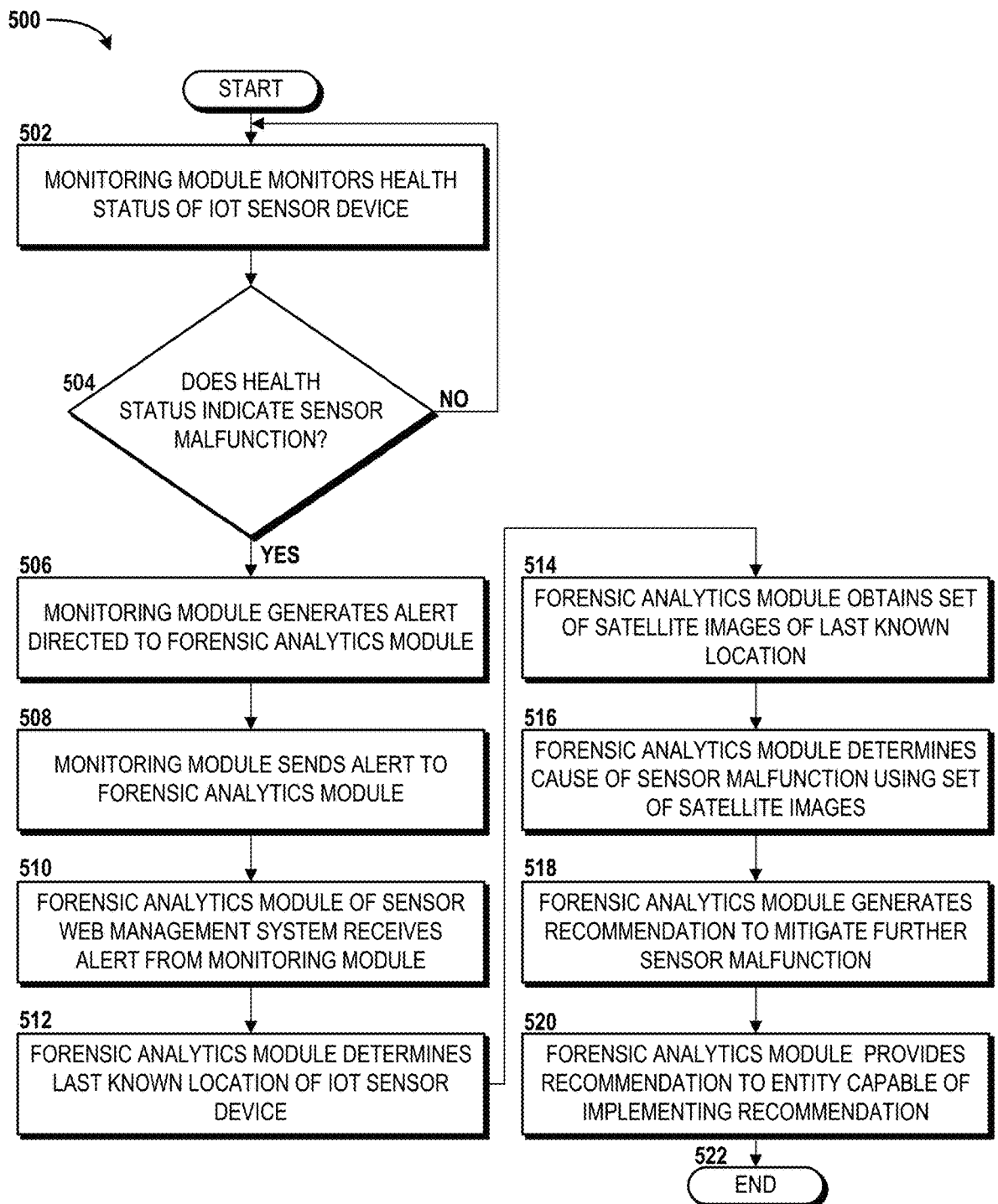
FIG. 5 is a flow diagram illustrating aspects of a method for operating the sensor web management system, according to an illustrative embodiment.

Turning now to FIG. 5, a flow diagram illustrating aspects of a method 500 for operating the sensor web management system 118 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the sensor web management system 118, of the IoT sensor device(s) 104, of the satellite communications system 106, and/or one or more other computing systems and/or devices disclosed herein to perform operations.

For purposes of illustrating and describing some of the concepts of the present disclosure, the methods disclosed herein are described as being performed, at least in part, by the sensor web management system 118, of the IoT sensor device(s) 104, of the satellite communications system 106 via execution of one or more software modules, such as the sensor web management system modules 208. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 will now be described with reference to FIG. 5 and additional reference to FIG. 2. The method 500 begins and proceeds to operation 502, where the IoT sensor device monitoring module 214 monitors the health status of the IoT sensor device 104. From operation 502, the method 500 proceeds to operation 504, where the IoT sensor device monitoring module 214 determines whether the health status indicates that the IoT sensor device 104 has experienced a sensor malfunction. If not, the method 500 returns to operation 502, wherein the IoT sensor device monitoring module 214 continues to monitor the health status of the IoT sensor device 104. If, however, the health status indicates that the IoT sensor device 104 has experienced a sensor malfunction, the method 500 proceeds to operation 506, where the IoT sensor device monitoring module 214 generates the alert 234 directed to the forensic analytics module 216.

From operation 506, the method 500 proceeds to operation 508, where the forensic analytics module 216 receives the alert 234 from the IoT sensor device monitoring module 214. From operation 510, the method 500 proceeds to operation 512, where the forensic analytics module 216 determines a last known location of the IoT sensor device 104 by consulting with the satellite imaging module 218 that, in turn, can access the satellite image database 224 for a last known location of the IoT sensor device 104, if available, and/or communicate with the satellite communications system 106 to obtain the last known location of the IoT sensor device 104. From operation 512, the method 500 proceeds to operation 514, where the forensic analytics module 216 obtains a set of satellite images of the last known location. From operation 514, the method 500 proceeds to operation 516, where the forensic analytics module 216 determines the cause of the sensor malfunction using the set of satellite images. For example, the forensic analytics module 216 can utilize forensic data to determine if there was flooding in the area where the IoT sensor device 104 malfunctioned; if there was suspicious activity in the area where the IoT sensor device 104 malfunctioned; if a vehicle is visible leaving the area, and if so, whether still or video images can be utilized to acquire a license plate number of the vehicle. On the other hand, if there are no direct physical interactions with the IoT sensor device 104, then it can be determined the malfunction is due to a cyber-attack or a simple malfunction. Cyber-attacks can be addressed in several ways. For example, security could be increased and/or a honey pot trap could be set to trace the root IP address back to the original hacker.

From operation 516, the method 500 proceeds to operation 518, wherein the forensic analytics module 216 generates one or more recommendations to mitigate or prevent further sensor malfunctions having similar condition(s). Recommendations can be based around the classification of a sensor malfunction event. In one example classification scheme, sensor malfunction events are classified into four event types as follows:

Event Type 1: Natural Disaster
   Examples: flood, fire, animal infestation
   Recommendations: Transfer sensor to a more protected area, supply physical protections.
Event Type 2: Human Physical Interaction
   Examples: theft or tampering
   Recommendations: Alert police, contact nearby business to request security camera footage, install security cameras.
Event Type 3: Cyber-Attack
   Examples: Data theft, data corruption, system takeover
   Recommendations: deploy security patch, set honey-pot trap to catch hacker's IP address.
Event Type 4: Normal System Malfunction
   Examples: loss of transmission capability, loss of sensor function
   Recommendations: fix or replace instrument.

From operation 518, the method 500 proceeds to operation 520, where the forensic analytics module 216 provides the recommendation(s) to an entity capable of implementing the recommendation(s). For example, the recommendation(s) can be provided to an automated software-based security system, to a software security team, to a private investigator, to law enforcement, to the manufacturer of the IoT sensor device 104 that experienced the malfunction, to a combination thereof, and/or to other entities. From operation 520, the method 500 proceeds to operation 522, where the method 500 ends.

Figure 6:
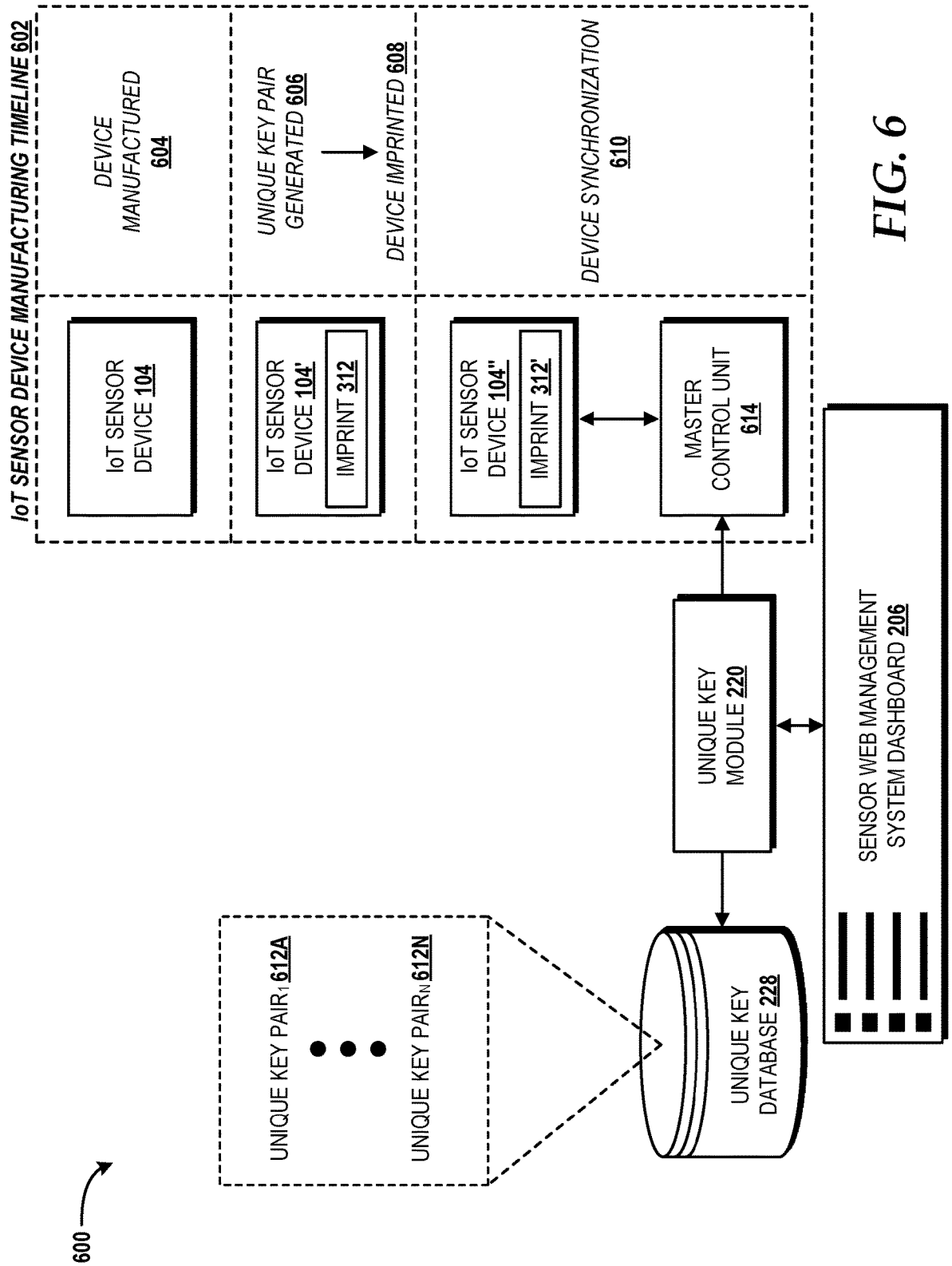
FIG. 6 is a block diagram illustrating aspects of an IoT sensor device manufacturing timeline, according to an illustrative embodiment.

Turning now to FIG. 6, a block diagram 600 illustrating aspects of an IoT sensor device manufacturing timeline 602 will be described, according to an illustrative embodiment. The block diagram 600 includes the IoT sensor device 104, the sensor web management system dashboard 206, the unique key database 228, and the unique key imprint ("imprint") 312 introduced above in FIGS. 1-3.

The IoT sensor device manufacturing timeline ("timeline") 602 begins when the IoT sensor device 104 is manufactured (shown generally at 604). During the manufacturing process or thereafter, the IoT sensor device manufacturer or another entity can generate a unique key pair (shown generally at 606) and the IoT device 104' can be imprinted (shown generally at 608) with the imprint 312. After being imprinted, the timeline 602 proceeds to device synchronization (shown generally at 610) during which the IoT sensor device 104" is synchronized with a master control unit 614.

Synchronization is a process by which the IoT sensor device 104 is paired with the master control unit 614, which will be listening for the sensor's data stream. This is done physically to improve security. Frequency maps or the encryption schemes are not broadcast over the Internet. Each of the IoT sensor devices 104 has a unique ID and a frequency map pattern and a simple encryption scheme. This information is saved to the master control unit 614, which can be implemented as an application that will be listening for the sensor's data stream.

The master control unit 614 shares the unique key pair contained with the imprint 312' with the unique key database 228 by way of the unique key module 220. In this manner, the sensor web 102 can provide upgraded data security. The master control unit 614 can follow an IoT sensor device's unique key on a packet-by-packet basis for a given data transmission. For example, a server can listen for a first data packet over a 5 GHz channel, a second data packet over a 2.4 GHz channel, a third data packet over the 2.4 GHz channel, and a fourth data packet over the 5 GHz channel, and so on. Therefore, even if data packets are being sniffed by a hacker, putting the packets back in order or establishing a context for the complete data transmission becomes exponentially more difficult the more IoT sensor devices that are connected to the sensor web 102. It is possible for an exemplary implementation of a sensor web to include tens of thousands to hundreds of thousands or greater numbers of individual IoT sensor devices.

Figure 7:
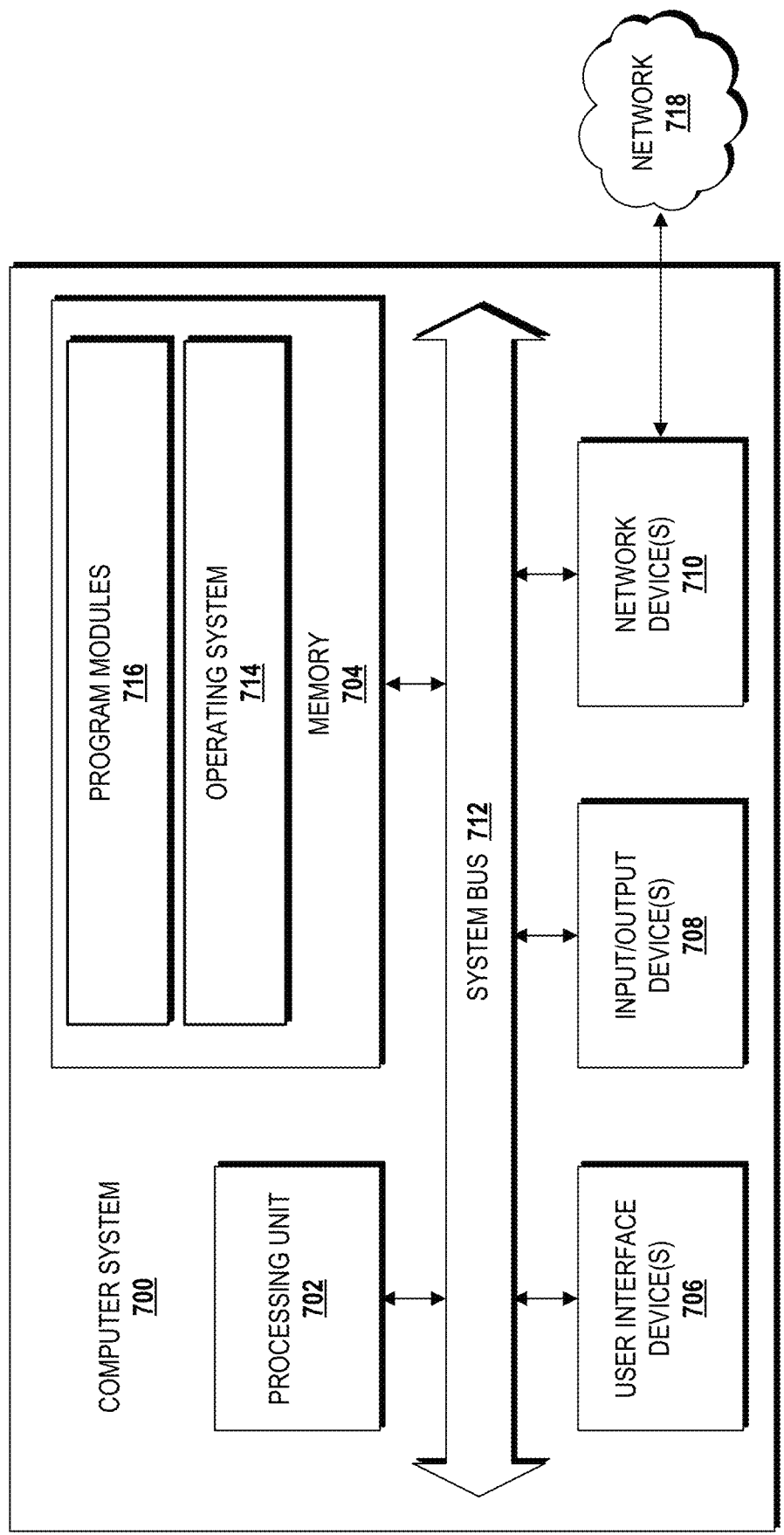
FIG. 7 is a block diagram illustrating an example computer system capable of implementing aspects of the embodiments presented herein.

Turning now to FIG. 7, a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710. In some embodiments, the sensor web management system 118, the satellite communications system 106, other systems disclosed or implied herein, or some combination thereof is/are configured, at least in part, like the computer system 700. It should be understood, however, that these systems may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The program modules 716 may include various software and/or program modules described herein. These and/or other programs can be embodied in computer-readable media containing instructions that, when executed by the processing unit 702, perform one or more operations and/or other functionality as illustrated and described herein. It can be appreciated that, at least by virtue of the instructions embodying, for example, the method 500 and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store any data described herein, if desired.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, a touchscreen, or an electronic stylus. Further, the I/O devices 708 may include one or more output devices, such as, but not limited to, a display screen or a printer.

The network devices 710 enable the computer system 700 to communicate with other networks or remote systems via a network 718 (e.g., the WWAN WI-FI access network 108, the WWAN cellular access network 110, the core network 112, and/or the PDN(s) 114. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless PAN ("WPAN") such as BLUETOOTH, or a wireless MAN ("WMAN"). Alternatively, the network 718 may be a wired network such as, but not limited to, a WAN such as the Internet, a LAN such as the Ethernet, a wired PAN, or a wired MAN.

Figure 8:
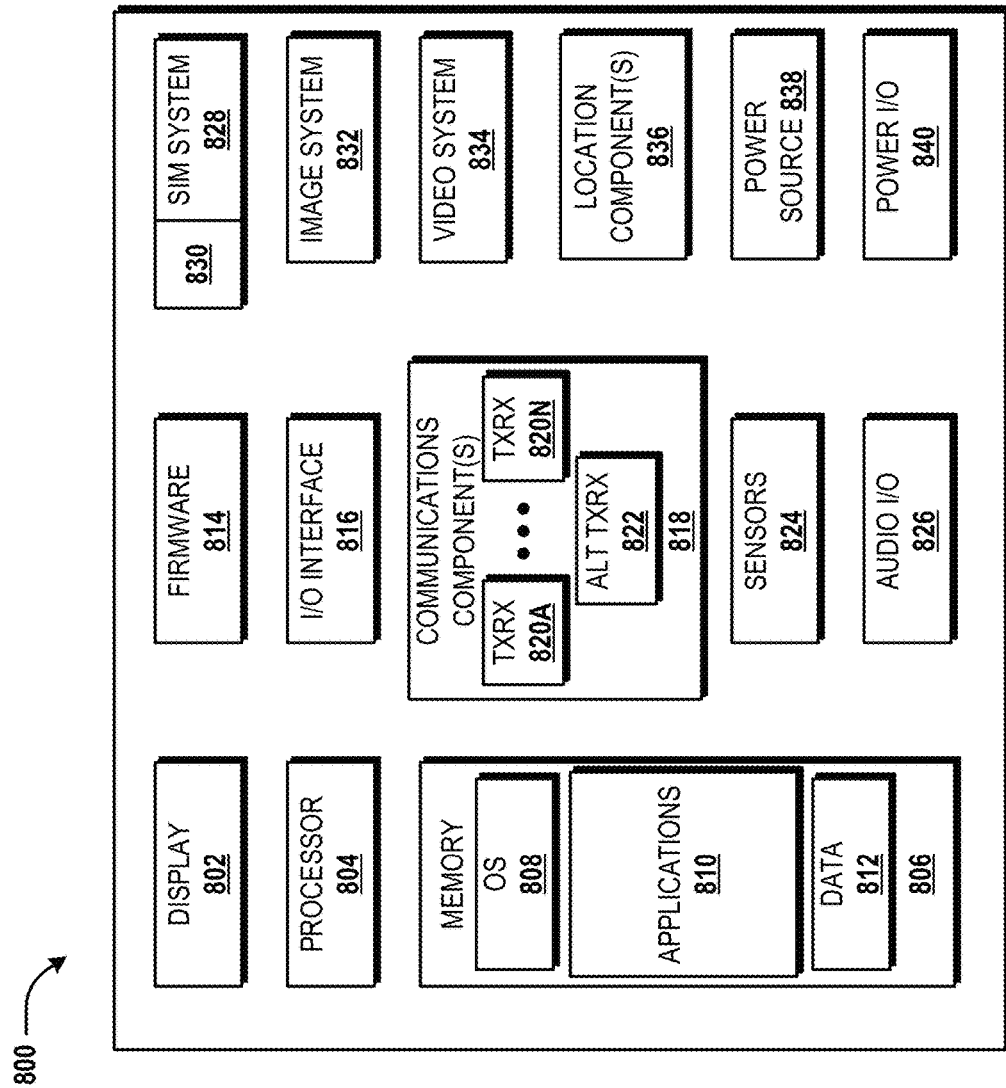
FIG. 8 is a block diagram illustrating an example mobile device capable of implementing aspects of the embodiments disclosed herein.

Turning now to FIG. 8, an illustrative mobile device 800 and components thereof will be described. In some embodiments, one or more of the IoT sensor devices 104 described above and/or other devices described herein can be configured as and/or can have an architecture similar or identical to the mobile device 800 described herein in FIG. 8. It should be understood, however, that device described or implied herein may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806.

The computer-executable instructions executed by the processor 804 can include, for example, an operating system 808, one or more applications 810, other computer-executable instructions stored in the memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in data communications, entering/deleting data, entering and setting user IDs and passwords for device access, configuring settings, manipulating content and/or settings, multimode interaction, interacting with other applications 810, and otherwise facilitating user interaction with the operating system 808, the applications 810, and/or other types or instances of data 812 that can be stored at the mobile device 800.

The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1384 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the WWAN WI-FI access network 108 and/or the WWAN cellular access network 110 described herein. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments, one or more of the transceivers of the communications component 818 may be configured to communicate using GSM, CDMAONE, CDMA2000, LTE, and various other 2G, 2.5G, 3G, 4G, 4.5G, 5G and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an N$^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system 800 described above with reference to FIG. 8. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Figure 9:
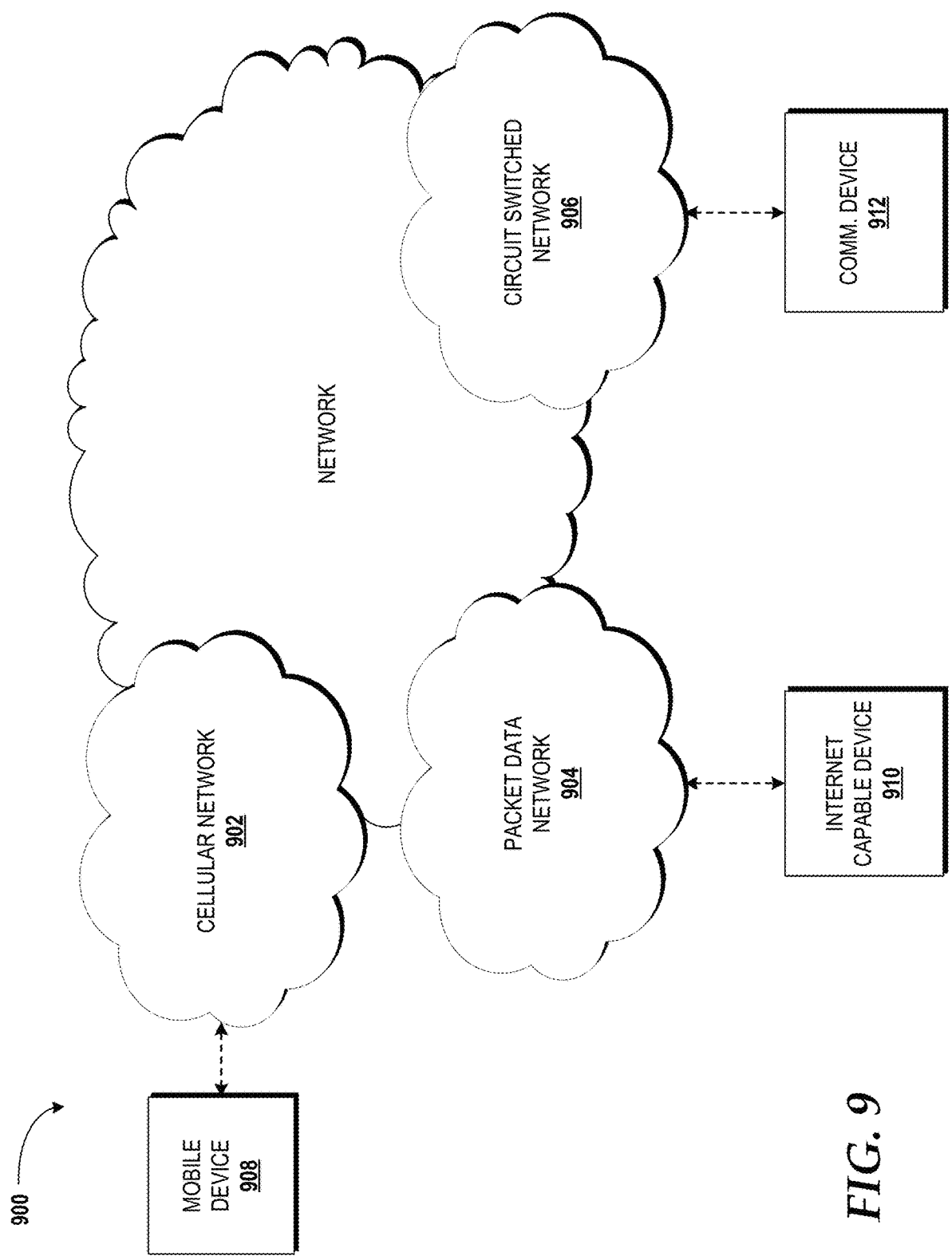
FIG. 9 is a diagram illustrating a network, according to an illustrative embodiment.

Turning now to FIG. 9, additional details of a network 900 are illustrated, according to an illustrative embodiment. The network 900 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to a cellular network. The cellular network 902 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 902 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 902 also is compatible with 4G mobile communications standards such as Long-Term Evolution ("LTE"), or the like, as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 99, for example, a PC, a laptop, a portable device, or another suitable device, can communicate with one or more cellular networks 902, and devices connected thereto, through the packet data network 904. It also should be appreciated that the Internet-capable device 99 can communicate with a packet data network through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 99. In the specification, the network 900 is used to refer broadly to any combination of the networks 902, 904, 906. It should be appreciated that substantially all of the functionality described with reference to the network 900 can be performed by the cellular network 902, the packet data network 904, and/or the circuit switched network 906, alone or in combination with other networks, network elements, and the like.

Based on the foregoing, it should be appreciated that concepts and technologies for a sensor web for IoT sensor devices has been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A sensor web management system comprising:
   a processor; and
   a memory comprising a monitoring module, a forensic analytics module, and computer-executable instructions that, when executed by the processor, cause the processor to perform operations comprising
      monitoring, by the monitoring module, a health status of an Internet of Things ("IoT") sensor device of a plurality of IoT sensor devices managed by the sensor web management system, wherein the IoT sensor device of the plurality of IoT sensor devices is associated with a unique frequency key used by the IoT sensor device during a data transmission such that each packet transmitted by the IoT sensor device during the data transmission is transmitted using a particular frequency defined in the unique frequency key on a packet-by-packet basis, and wherein the unique frequency key is physically imprinted on the IoT sensor device so that the particular frequency defined in the unique frequency key on the packet-by-packet basis does not need to be communicated via a network,
      determining, by the monitoring module, that the health status of the IoT sensor device indicates a sensor malfunction experienced by the IoT sensor device,
      generating, by the monitoring module, an alert directed to the forensic analytics module, wherein the alert identifies the sensor malfunction associated with the IoT sensor device,
      sending, by the monitoring module, the alert to the forensic analytics module,
      in response to the alert, determining, by the forensic analytics module, a last known location of the IoT sensor device,
      obtaining, by the forensic analytics module, a set of satellite images of the last known location of the IoT sensor device, and
      utilizing, by the forensic analytics module, the set of satellite images of the last known location of the IoT sensor device to determine, at least in part, a cause of the sensor malfunction.

2. The sensor web management system of claim 1, wherein the operations further comprise reporting the cause of the sensor malfunction.

3. The sensor web management system of claim 1, wherein the operations further comprise generating a recommendation comprising a course of action to mitigate a further sensor malfunction due to the cause.

4. The sensor web management system of claim 3, wherein the operations further comprise providing the recommendation to an entity capable of implementing the course of action to mitigate the further sensor malfunction due to the cause.

5. The sensor web management system of claim 1, wherein the sensor malfunction comprises a data stream malfunction.

6. The sensor web management system of claim 1, wherein the sensor malfunction comprises a lost signal malfunction.

7. The sensor web management system of claim 1, wherein the sensor malfunction comprises a location shift malfunction.

8. The sensor web management system of claim 1, wherein the sensor malfunction comprises a location unavailable malfunction.

9. The sensor web management system of claim 1, wherein utilizing, by the forensic analytics module, the set of satellite images of the last known location of the IoT sensor device to determine the cause of the sensor malfunction comprises comparing the set of satellite images to an archive of satellite images of the last known location of the IoT sensor device to determine whether the cause of the sensor malfunction is identifiable via a change within the set of satellite images from the archive of satellite images.

10. The sensor web management system of claim 9, wherein the operations further comprise recording a time associated with the change.

11. The sensor web management system of claim 9, wherein the operations further comprise compiling a list of surveillance systems located within an area served by the IoT sensor device.

12. The sensor web management system of claim 9, wherein the operations further comprise notifying law enforcement of the change.

13. The sensor web management system of claim 1, wherein utilizing, by the forensic analytics module, the set of satellite images of the last known location of the IoT sensor device to determine the cause of the sensor malfunction comprises determining the cause of the sensor malfunction to be a natural cause, a local cyber-attack, or a remote cyber-attack.

14. A method comprising:
   monitoring, by a monitoring module of a sensor web management system, a health status of an Internet of Things ("IoT") sensor device of a plurality of IoT sensor devices managed by the sensor web management system, wherein the IoT sensor device of the plurality of IoT sensor devices is associated with a unique frequency key used by the IoT sensor device during a data transmission such that each packet transmitted by the IoT sensor device during the data transmission is transmitted using a particular frequency defined in the unique frequency key on a packet-by-packet basis, wherein the unique frequency key is physically imprinted on the IoT sensor device, during manufacture, so that the particular frequency defined in the unique frequency key on the packet-by-packet basis does not need to be communicated via a network;
   determining, by the monitoring module, that the health status of the IoT sensor device indicates a sensor malfunction experienced by the IoT sensor device;
   generating, by the monitoring module, an alert directed to a forensic analytics module of the sensor web management system, wherein the alert identifies the sensor malfunction associated with the IoT sensor device;
   sending, by the monitoring module, the alert to the forensic analytics module;
   in response to the alert, determining, by the forensic analytics module, a last known location of the IoT sensor device;
   obtaining, by the forensic analytics module, a set of satellite images of the last known location of the IoT sensor device, and
   utilizing, by the forensic analytics module, the set of satellite images of the last known location of the IoT sensor device to determine, at least in part, a cause of the sensor malfunction.

15. The method of claim 14, further comprising:
   reporting the cause of the sensor malfunction;

generating a recommendation comprising a course of action to mitigate a further sensor malfunction due to the cause; and providing the recommendation to an entity capable of implementing the course of action to mitigate the further sensor malfunction due to the cause.

16. The method of claim 14, wherein utilizing, by the forensic analytics module, the set of satellite images of the last known location of the IoT sensor device to determine the cause of the sensor malfunction comprises comparing the set of satellite images to an archive of satellite images of the last known location of the IoT sensor device to determine whether the cause of the sensor malfunction is identifiable via a change within the set of satellite images from the archive of satellite images; and further comprising:

recording a time associated with the change; and compiling a list of surveillance systems located within an area served by the IoT sensor device.

17. A computer-readable storage medium comprising a monitoring module, a forensic analytics module, and instructions that, when executed by a processor of a sensor web management system, cause the processor to perform operations comprising:

monitoring, by the monitoring module, a health status of an Internet of Things ("IoT") sensor device of a plurality of IoT sensor devices managed by the sensor web management system, wherein the IoT sensor device of the plurality of IoT sensor devices is associated with a unique frequency key used by the IoT sensor device during a data transmission such that each packet transmitted by the IoT sensor device during the data transmission is transmitted using a particular frequency defined in the unique frequency key on a packet-by-packet basis, and wherein the unique frequency key is physically imprinted on the IoT sensor device, during manufacture, so that the particular frequency defined in the unique frequency key on the packet-by-packet basis does not need to be communicated via a network;

determining, by the monitoring module, that the health status of the IoT sensor device indicates a sensor malfunction experienced by the IoT sensor device;

generating, by the monitoring module, an alert directed to the forensic analytics module, wherein the alert identifies the sensor malfunction associated with the IoT sensor device;

sending, by the monitoring module, the alert to the forensic analytics module;

in response to the alert, determining, by the forensic analytics module, a last known location of the IoT sensor device;

obtaining, by the forensic analytics module, a set of satellite images of the last known location of the IoT sensor device, and utilizing, by the forensic analytics module, the set of satellite images of the last known location of the IoT sensor device to determine, at least in part, a cause of the sensor malfunction.

18. The computer-readable storage medium of claim 17, wherein the operations further comprise:

reporting the cause of the sensor malfunction;

generating a recommendation comprising a course of action to mitigate a further sensor malfunction due to the cause; and providing the recommendation to an entity capable of implementing the course of action to mitigate the further sensor malfunction due to the cause.

19. The computer-readable storage medium of claim 17, wherein utilizing, by the forensic analytics module, the set of satellite images of the last known location of the IoT sensor device to determine the cause of the sensor malfunction comprises comparing the set of satellite images to an archive of satellite images of the last known location of the IoT sensor device to determine whether the cause of the sensor malfunction is identifiable via a change within the set of satellite images from the archive of satellite images; and wherein the operations further comprise:

recording a time associated with the change; and compiling a list of surveillance systems located within an area served by the IoT sensor device.

20. The computer-readable storage medium of claim 19, wherein utilizing the set of satellite images of the last known location of the IoT sensor device to determine the cause of the sensor malfunction comprises determining the cause of the sensor malfunction to be a natural cause, a local cyber-attack, or a remote cyber-attack.

* * * * *